June 29, 1937.  K. B. KILBORN  2,085,369

VALVE

Filed Sept. 13, 1934

INVENTOR
KARL B. KILBORN

BY
Ely Barrow

ATTORNEYS

Patented June 29, 1937

2,085,369

UNITED STATES PATENT OFFICE 2,085,369

VALVE

Karl B. Kilborn, Akron, Ohio, assignor to Seiberling Latex Products Company, Akron, Ohio, a corporation of Ohio Application September 13, 1934, Serial No. 743,811

6 Claims. (Cl. 273—65)

This invention relates to an improvement in valve structures adapted to retain air or other fluid within hollow, inflatable articles, and more particularly rubber articles such as playing ball bladders and the like.

Heretofore it has been the practice to provide bladders and similar articles with hollow tubes or extensions through which air or other suitable mediums could be introduced for inflating the article, and to prevent escape of the medium after inflation this tube was bent over upon itself and secured with a rubber band or string. Such a fastening had numerous disadvantages, among which were that leakage occurred readily, the bent-over tube formed a projection or hump undesirable when the article was used, and it necessitated lacing after inflation so that it was impossible to obtain a good joint.

It is therefore one of the objects of the present invention to provide a valve structure of the type referred to which is contained within the bladder or similar article to be inflated, thereby overcoming the aforementioned objections.

A further object of the invention is to provide a valve structure which is simple in construction, efficient in operation and inexpensive to manufacture.

With the objects above indicated and other objects hereinafter explained in view, my invention consists in the construction and combination of elements hereinafter described and claimed.

Referring to the drawing.

Figure 1:
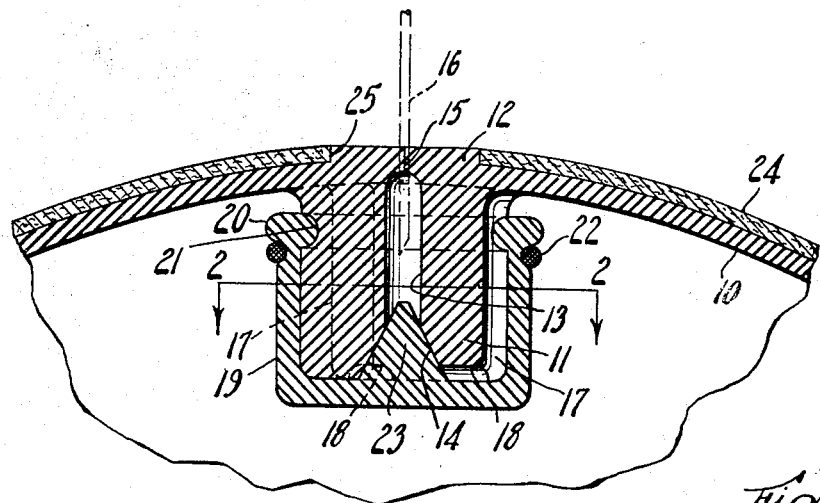
Figure 1 is a vertical sectional view of a valve structure embodying the present invention.
Figure 2:
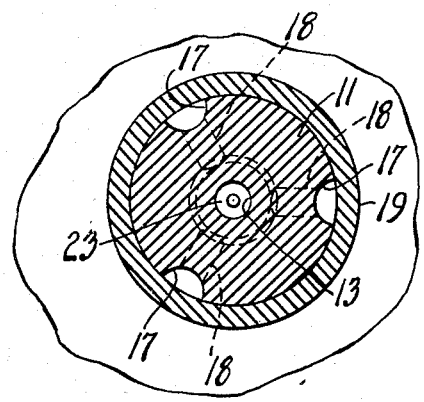
Figure 2 is a transverse sectional view taken on line 2—2 of Figure 1.

In the drawing, the preferred construction of a valve embodying the present invention is shown which comprises a bladder 10 preferably of rubber or other suitable elastic material of hollow formation and which is adapted to be inflated with any suitable medium such as air. At one portion the bladder 10 has a circular extension 11 of substantially rigid rubber material projecting inwardly any desirable distance which is preferably formed integral therewith. On the outer side and concentric with the extension is a circular projection 12 also formed integral therewith and for a purpose to be later described.

The extension 11 has an axial bore 13, the inner portion of which is flared outwardly to provide a valve seat 14, while the opposite end communicates with an axial opening 15 provided in the outer end, and projection 12 which is adapted to receive the end 16 of an inflating device (not shown). This opening 15 may be made by piercing the outer wall of the circular extension by means of a hypodermic needle or similar tool in the first instance, or it may be provided during the molding operation in the usual manner as may be desired. The outer wall or surface of the extension 11 has grooves 17 extending longitudinally throughout its length and at the inner end radial grooves 18 which communicate at one end with the grooves 17 and at the opposite end with the valve seat 14. While three sets of communicating grooves are shown, it should be understood that a greater or lesser number may be employed without affecting the operation and desired results.

A cup-shaped rubber member 19 is positioned upon the inner end of the extension 11 and has a circumferential bead 20 at its open end which fits within a circumferential groove 21 provided in the outer wall of the extension 10 adjacent to the bladder but slightly spaced therefrom so as not to interfere with or obstruct the ends of the grooves 17. To retain the cup-shaped member 19 in place upon the extension 11, a rubber band, string or metal clip 22 may be engaged around the member 19 beneath the bead 20 so as to prevent accidental disengagement.

A valve member 23 of rubber is provided upon the inner surface of the cup-shaped member 19 and has a formation or taper complementary to the flared valve seat 14 with which it is adapted to engage, but which may be easily removed from its seat to permit inflation of the bladder and to prevent the escapement of air from within the bladder. The cup-shaped member 19 is preferably of slightly smaller diameter than the diameter of the extension 11 so that the former must be stretched in placing the same over the extension in order to insure a tight fit.

These bladders are usually employed inside of a covering such as indicated by 24 and in the present instance the covering has an opening 25 which receives the extension 12 to maintain the bladder in proper position for inflating. It should be understood, however, that the valve structure embodying the present invention may be built directly into the covering if the latter is made of a suitable inflatable material. When the circular extension 11 is made integral with the bladder as shown in Figure 1, the bladder is formed in section and suitably secured together in any well-known manner.

Assuming the various parts to be in the relation shown in Figure 1, the bladder 10 may be inflated by inserting the end 16 of an inflating device through the opening 15 to a position indicated by the dotted lines. The air may then be introduced through the end 16 and the pressure will cause the valve 23 to be moved out of engagement with its valve seat 14 and permit the air to flow through the grooves 18 and their communicating grooves 17 to the interior of the bladder. Upon shutting off the flow of air from the inflating device, the built-up pressure in the bladder exerts a force upon the end of the cup-shaped member 19, causing the valve 23 to move into engagement with the valve seat 14 and thus preventing any outflow of air from within the bladder through the grooves 17 and 18, the valve member 23 closing the adjacent ends of the grooves 18. As the pressure within the bladder maintains the valve 23 in continual engagement with its valve seat 14, there is no chance for the air to escape and consequently the bladder will remain inflated indefinitely.

Figure 3:
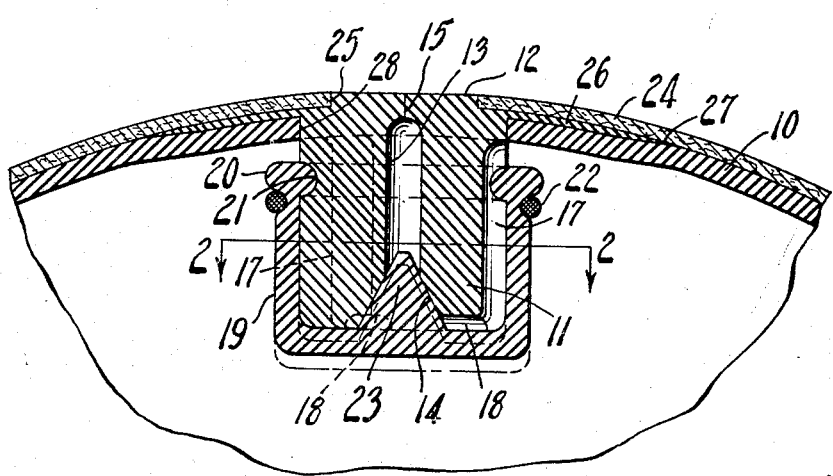
Figure 3 is a vertical sectional view of a modified form of valve structure embodying the present invention and having a transverse section the same as that shown in Figure 2.

To deflate the bladder, it is only necessary to employ a match stem or similar implement inserted through the opening 15 and depress the valve member 23 to remove the latter from its valve seat 14 as indicated in dotted lines in Figure 3. This will permit the air contained in the bladder to flow through the grooves 17 and 18, the bore 13 and through the opening 15 around the implement to atmosphere.

In the modification shown in Figure 3, the valve structure is illustrated separately from the bladder, the latter being of the seamless type wherein it would be difficult to produce an integral construction as shown in Figure 1.

The various elements, however, are identical with those of Figure 1, the main difference being in the provision of a circular laterally extending flange 26 formed integral with the upper portion of the extension 11. This flange is preferably of rubber and relatively thin, having a tapered outer edge 27. The flange is inserted between the inner surface of the outer casing 24 and the outer surface of the bladder 10 and may be secured to either or both by the use of a suitable adhesive or cement. The bladder is provided with an opening 28 within which the extension 11 is disposed. It will be understood that to inflate and deflate the bladder shown in Figure 3, the same procedure is followed as heretofore explained in connection with the preferred construction shown in Figure 1.

Of course it should be understood that different materials may be employed in producing the valve structure and that the valve structure is capable of use in numerous other instances.

While I have described the preferred embodiment of the invention, it is to be understood that I am not to be limited thereto as changes and modifications may be resorted to without departing from the spirit of the invention as defined in the appended claims.

What is claimed is:

1. A valve structure for inflatable articles comprising a member secured to the inflatable article and extending inwardly thereof, said member having a central bore providing a valve seat at its inner end, a groove communicating with said bore and the interior of said inflatable article, and an opening communicating with said bore and the atmosphere through which a fluid medium may flow in inflating and deflating the inflatable article, and a cup-shaped member detachably secured to said member and having a portion yieldably engageable with said valve seat for controlling the flow of medium through said bore and groove.

2. A valve structure for inflatable articles comprising a substantially rigid rubber member secured to the inflatable article and extending inwardly thereof, said member having a central bore terminating short of the outer end thereof and a smaller opening connecting the bore with the atmosphere and a passageway connecting the inner end of said bore with the interior of the inflatable article, and an elastic cup-shaped member enclosing the inner end of said rubber member and having its open end secured to said rubber member, said cup-shaped member having a portion yieldably engageable with said rubber member for controlling the flow of medium through said bore.

3. A valve structure for inflatable articles comprising a substantially rigid circular rubber member secured to the inflatable article and extending inwardly thereof, said rubber member having a central bore communicating with an inlet opening at one end, said member being further provided with a radial groove on its inner end and a longitudinal groove on its outer surface communicating with the bore and interior of the inflatable article respectively, and an elastic cup-shaped member having a circular side wall enclosing the inner end of said rubber member and having its open end secured to said rubber member, said cup-shaped member having a bottom portion yieldably engageable with the inner end of said rubber member for controlling the flow of medium through said passageway.

4. A valve structure for inflatable articles comprising a member secured to the inflatable article and extending inwardly thereof, said member having a central bore communicating with an inlet opening at one end and having a flared portion at the opposite end to provide a valve seat, said member being further provided with a plurality of radially and longitudinally extending grooves communicating with said bore and with the interior of the inflatable article whereby a fluid medium may flow in inflating and deflating the inflatable article, and means connected to said member and having a cooperating valve portion yieldably engageable with said valve seat for controlling the flow of medium thereby.

5. A valve structure for inflatable articles comprising a member secured to the inflatable article and extending inwardly thereof, said member having a fluid medium passageway therethrough, said member being further provided with at least one radially and longitudinally extending groove communicating with said passageway and with the interior of the inflatable article, and means connected to said member and having a portion movable to open and close said passageway to control the flow of fluid therethrough.

6. A valve structure for inflatable articles comprising a member secured to the inflatable article and extending inwardly thereof, said member having a fluid medium passageway therethrough, said member being further provided on its outer surface with at least one groove communicating with said passageway and with the interior of the inflatable article, and means connected to said member and having a portion movable to open and close said passageway and said groove to control the flow of fluid therethrough.

KARL B. KILBORN.